(12) United States Patent
Zeng et al.

(10) Patent No.: US 11,892,119 B1
(45) Date of Patent: Feb. 6, 2024

(54) SUCTION-OPERATED DEVICE

(71) Applicant: TILTA INC., Burbank, CA (US)

(72) Inventors: Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/108,758

(22) Filed: Feb. 13, 2023

(51) Int. Cl.
| *F16M 11/24* | (2006.01) |
| *B60R 9/058* | (2006.01) |
| *B60R 9/045* | (2006.01) |
| *F16B 47/00* | (2006.01) |
| *F16M 11/20* | (2006.01) |

(52) U.S. Cl.
CPC .......... *F16M 11/247* (2013.01); *B60R 9/045* (2013.01); *B60R 9/058* (2013.01); *F16B 47/00* (2013.01); *F16M 11/205* (2013.01); *F16M 2200/021* (2013.01); *F16M 2200/08* (2013.01)

(58) Field of Classification Search
CPC .............. F16M 11/247; F16M 11/205; F16M 2200/021; F16M 2200/08; B60R 9/045; B60R 9/058; F16B 47/00
USPC ... 248/467, 537, 205.5, 205.8, 206.2, 206.3, 248/309.4, 362, 363
See application file for complete search history.

(56) References Cited

U.S. PATENT DOCUMENTS

| 2,049,872 | A | * | 8/1936 | Shinichi | B65B 31/04 |
| | | | | | 92/110 |
| 2,596,860 | A | * | 5/1952 | Mccrory | B60R 9/058 |
| | | | | | 224/325 |
| 2,624,497 | A | * | 1/1953 | Newman | B60P 3/1025 |
| | | | | | 224/310 |
| 3,347,327 | A | * | 10/1967 | Gunter | B25B 11/005 |
| | | | | | 177/208 |
| 3,593,983 | A | * | 7/1971 | Csenyi | E04G 15/061 |
| | | | | | 269/21 |
| 3,712,524 | A | * | 1/1973 | Ames, Sr. | B60P 3/1025 |
| | | | | | 224/310 |
| 3,785,691 | A | * | 1/1974 | Sperry | B66C 1/0293 |
| | | | | | 294/186 |
| 6,431,624 | B1 | * | 8/2002 | Dunger | B25J 15/0616 |
| | | | | | 294/186 |
| 7,124,987 | B2 | * | 10/2006 | Zschiedrich | F16B 47/00 |
| | | | | | 248/205.9 |
| 9,669,442 | B1 | * | 6/2017 | Alvarez | B21D 1/06 |
| 2002/0175527 | A1 | * | 11/2002 | Huang | B25B 11/007 |
| | | | | | 294/187 |

(Continued)

*Primary Examiner* — Muhammad Ijaz
(74) *Attorney, Agent, or Firm* — Loza & Loza, LLP; Derek Yeung

(57) ABSTRACT

The present disclosure belongs to the field of suction-operated devices, in particular to a sucker device. The device includes a sucker, a rotating member and a connecting member, wherein both ends of the rotating member are rotatably and movably connected to the connecting member and the sucker respectively, the sucker is provided with a fixing position for fixing the device on an external structure by suction, and the connecting member is provided with a connecting position for mounting a structure to be carried. In the present disclosure, both ends of the rotating member are rotatably and movably connected to the connecting member and the sucker, so that when the device is used, the suction-operated device has a larger angle adjustment range, and can better meet the use requirements of consumers.

8 Claims, 5 Drawing Sheets

(56) References Cited

U.S. PATENT DOCUMENTS

| | | | |
|---|---|---|---|
| 2009/0175747 A1* | 7/2009 | LeBoeuf | F04B 33/00 |
| | | | 417/545 |
| 2016/0108954 A1* | 4/2016 | Chen | F16M 11/041 |
| | | | 248/205.8 |
| 2018/0037172 A1* | 2/2018 | Nelson | F16M 11/2092 |
| 2021/0207647 A1* | 7/2021 | Liao | B65G 47/91 |
| 2021/0324841 A1* | 10/2021 | Schmidt | F04B 39/121 |

* cited by examiner

SUCTION-OPERATED DEVICE

TECHNICAL FIELD

The present disclosure belongs to the field of suction-operated devices, in particular to a sucker device.

BACKGROUND

The sucker structure (e.g., a suction cup) is widely used in various fields. It can be used as both a suction-operated grasping structure and a suction-operated fixing structure.

A first reference (Chinese Patent Application No. CN201910733589.7) relates to a vehicle roof luggage loading device (e.g., roof rack). The vehicle roof luggage loading device includes a supporting frame and a luggage rack provided on the supporting frame. The supporting frame includes two supporting rods provided in parallel and a sucker provided on the supporting rods at intervals along the axial direction of the supporting rods. The sucker is configured to be attached (by suction or negative pressure) on the vehicle roof to fix the supporting frame. The sucker is hinged with the supporting rods so that the sucker may rotate around the direction perpendicular to the axial direction of the supporting rods. The luggage rack is detachably fixed on the supporting rods. In the device of the first reference, the sucker plays the role of attachment and fixation. In the vehicle roof luggage loading device, the sucker may rotate relative to a pipe clamp, and the angle of the two may be adjusted by rotation. However, the angle adjustment range is small, which cannot meet various mounting requirements, and the structure cannot meet the user's requirements.

SUMMARY

In order to solve the above problems, some aspects of the present disclosure provide a suction-operated device, which can be attached and fixed on an external structure (e.g., a mounting frame or rack), and has a large angle adjustment range, which can better meet the user's requirements in various applications.

In order to achieve the above aspects, the technical schemes of the present disclosure are as follows.

One aspect of the disclosure provides a suction-operated device that includes a sucker, a rotating member including a first end and a second end, and a connecting member. The first end and the second end of the rotating member are rotatably and movably connected to the connecting member and the sucker respectively. The sucker is configured to fix the suction-operated device on an external structure by controlling a suction, and the connecting member is provided with a connecting position for mounting a structure in the connecting position.

In one aspect, the suction-operated device further includes a first locking member configured to control a motion or a locking position of the sucker relative to the rotating member. The rotating member is movably connected with the sucker at a joint between the sucker and the rotating member.

In one aspect, the suction-operated device further includes a second locking member configured to control a motion or a locking position of the rotating member relative to the connecting member, wherein the connecting member is movably connected with the rotating member at a joint between the rotating member and the connecting member.

In one aspect, the suction-operated device further includes a connecting pipe, wherein the connecting member includes a pipe clamp to provide the connection position, and the connecting pipe is provided at the connecting position.

In one aspect, the sucker includes an electric sucker configured to control a suction used to fix the suction-operated device on the external structure.

In one aspect, a mounting cavity is provided in the connecting pipe. The suction-operated device further includes a controller in the mounting cavity of the connecting pipe. The controller is configured to control an operation of the sucker. The suction-operated device further includes an air pipe. A first end of the air pipe is connected to the sucker, and a second end of the air pipe is connected to the controller through a first end of the connecting pipe.

In one aspect, the suction-operated device further includes a protective bracket in the mounting cavity, and the protective bracket is configured to protect the controller located in the protective bracket.

In one aspect, the controller comprises an air pressure sensor, a vacuum pump, a circuit board, and a battery. The battery, the air pressure sensor, and the vacuum pump are electrically connected to the circuit board; and the air pressure sensor, the vacuum pump, the circuit board, and the battery are provided in the mounting cavity. The first end of the connecting pipe is provided with an air passage quick-release connector, the air pressure sensor and the vacuum pump are connected to a first end of the air passage quick-release connector, and a second end of the air passage quick-release connector is connected to the second end of the air pipe.

In one aspect, the suction-operated device further includes an air suction pipe on the sucker and a one-way valve on the sucker. A first end of the air suction pipe connects to the sucker, a second end of the air suction pipe connects to a first end of the one-way valve, and a second end of the one-way valve connects to a first end of the air pipe.

In one aspect, a second end of the connecting pipe is provided with a mounting and dismounting head for mounting and dismounting the connecting pipe from the external structure.

In one aspect, the pipe clamp includes an upper pipe clamp and a lower pipe clamp, and the connecting position is formed between the upper pipe clamp and the lower pipe clamp. A first end of the upper pipe clamp is hinged with a first end of the lower pipe clamp. A second end of the lower pipe clamp is hinged with a clamping member for locking the connecting pipe in the connecting position. A second end of the upper pipe clamp is provided with a clamping groove corresponding to the clamping member.

The present disclosure has the advantages that, in the device, both ends of the rotating member are rotatably and movably connected to the connecting member and the sucker, so that when the device is used, the suction-operated device has a larger angle adjustment range, and can better meet the use requirements of consumers.

DETAILED DESCRIPTION

In order to achieve the object, technical schemes, and advantages of the present disclosure clearer, the present disclosure will be further described in detail with reference to the accompanying drawings and embodiments. It should be understood that the specific embodiments described here are intended for illustrating the present disclosure, but not for limiting the present disclosure.

Figure 1:
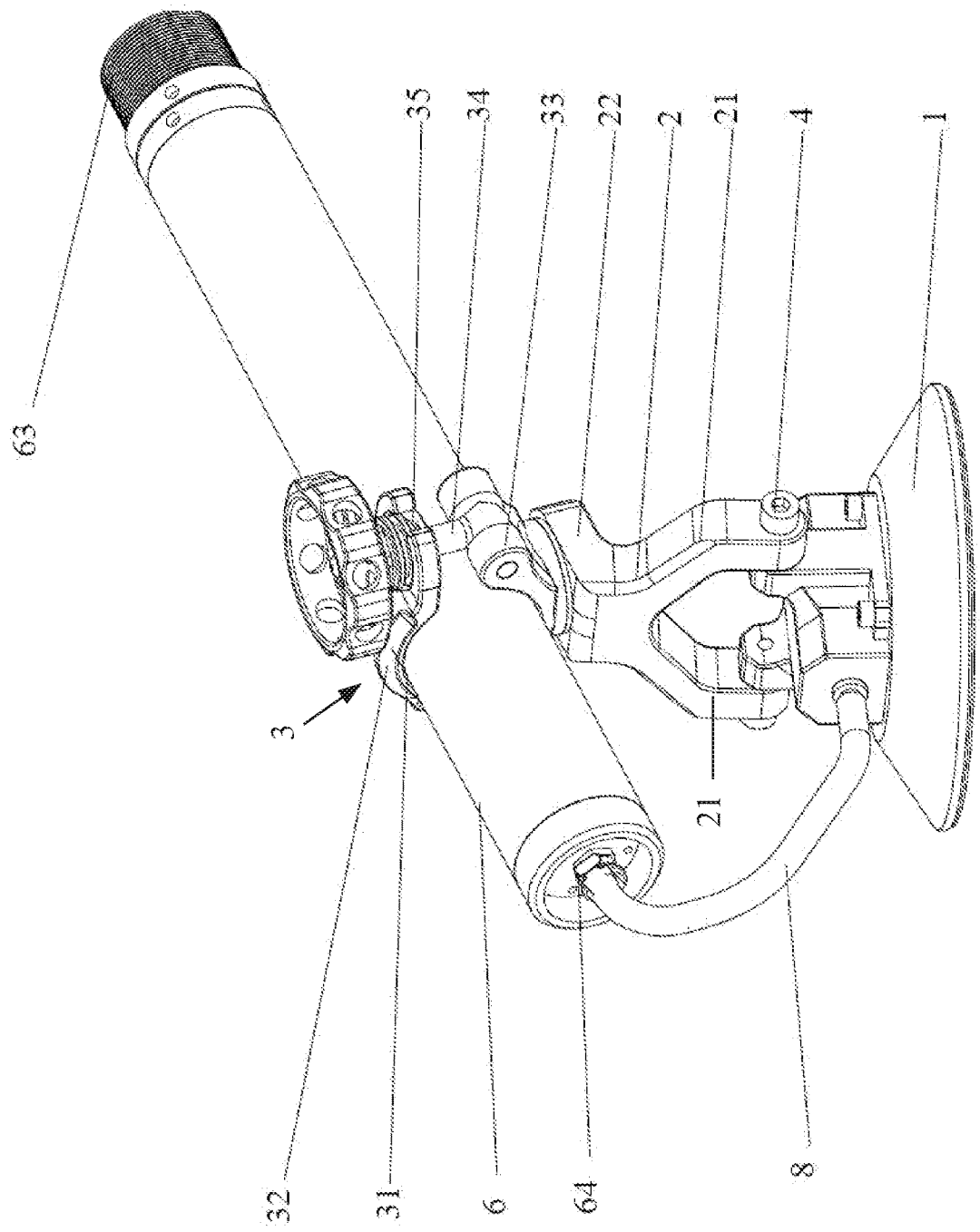
FIG. 1 is a schematic diagram of a suction-operated device according to some aspects of the present disclosure.
Figure 2:
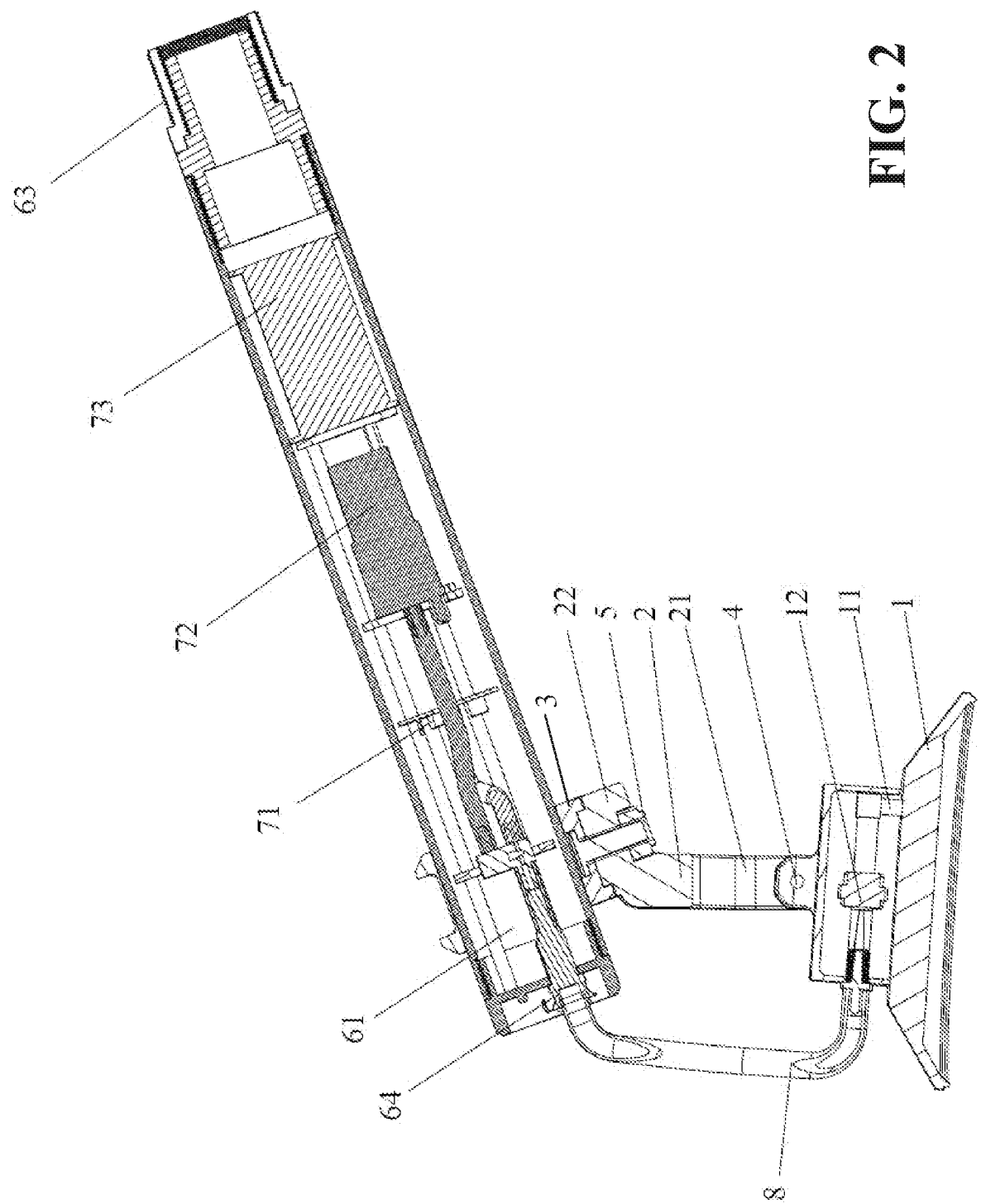
FIG. 2 is a sectional view of the suction-operated device of FIG. 1.
Figure 3:
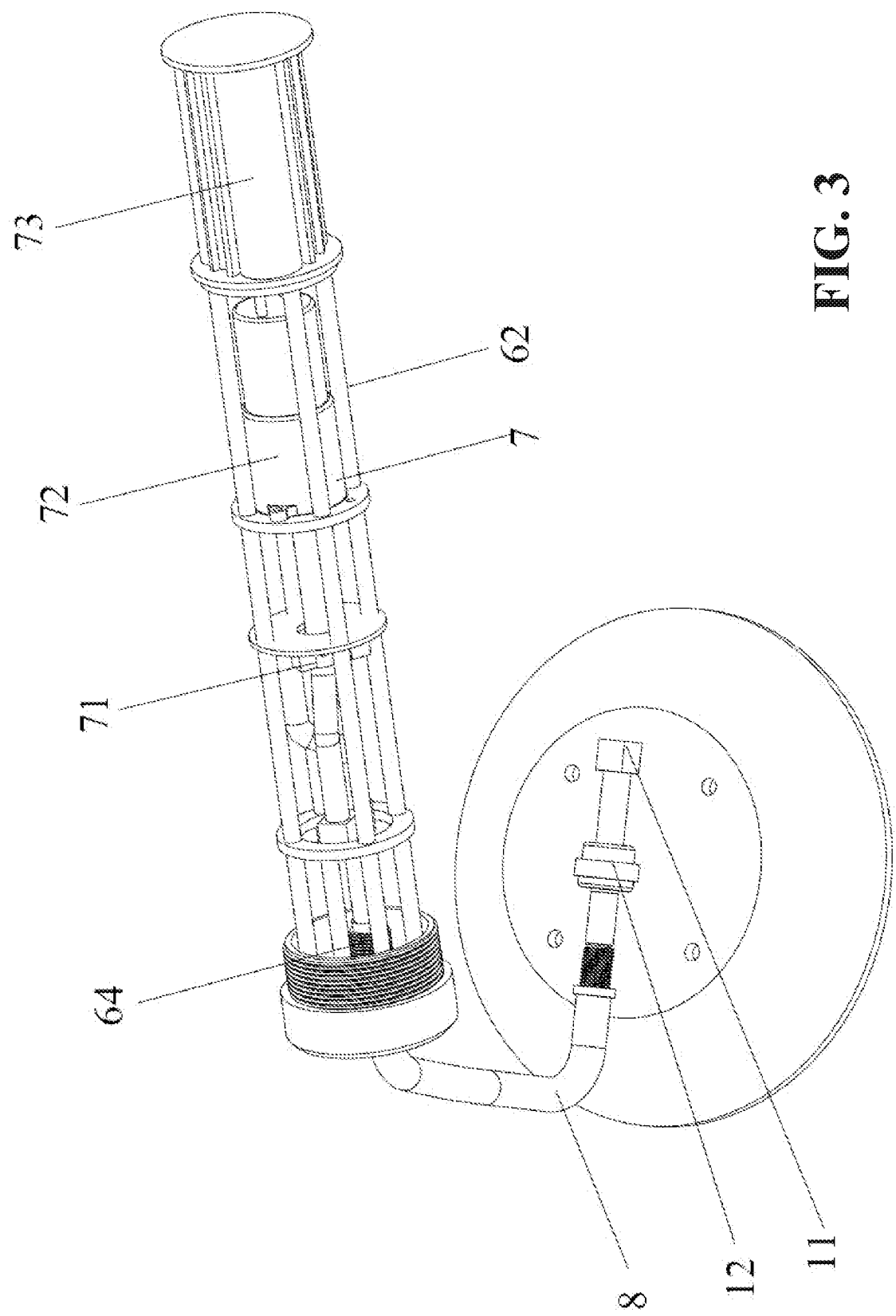
FIG. 3 is a schematic diagram illustrating a connection structure between a sucker and a controller according to some aspects of the disclosure.

Referring to FIGS. 1-3, a suction-operated device is characterized by including a sucker 1, a rotating member 2, and a connecting member 3. In some aspects, the sucker 1 may be a suction cup, a vacuum cup, or a vacuum pad. The sucker 1 can be made of a resilient material (e.g., silicon, rubber, polymer, soft plastic, etc.). A first end of the rotating member 2 is rotatably and movably connected to the connecting member 3, and a second end of the rotating member 2 is rotatably and movably connected to the sucker 1. The sucker 1 can be operated to fix the device at a position (fixing position) on an external structure or surface (e.g., car roof) by suction. The connecting member 3 is provided with a connecting position 31 for mounting a device or structure to be carried by the suction-operated device.

In this embodiment, a first locking member 4 is provided for controlling the movement (e.g., motion or locking position) of the sucker 1 relative to the rotating member 2. The rotating member 2 is movably connected at a joint formed between the sucker 1 and the rotating member 2. The lower end (a lower end in FIG. 1) of the rotating member 2 is provided with two lower rotating members 21, so that the lower end of the rotating member 2 forms a U shape as a whole, and the two lower rotating members 21 are respectively provided on both sides of the sucker 1. The number of the first locking members 4 may be two, and each first locking member 4 is movably connected to the corresponding lower rotating member 21 and a side edge of the sucker 1.

In some aspects, the first locking member 4 may be a screw, which serves as both a hinge shaft and a locking member. The first locking member 4 and the lower rotating member 21 are rotatably and movably connected by the first locking member 4. In some aspects, there is no thread structure between the first locking member 4 and the lower rotating member 21. One end of the first locking member 4 movably passes through the lower rotating member 21 and is movably connected to a side of the sucker 1 through a screw structure. When the first locking member 4 is rotated, one end of the first locking member 4 extends into the side edge of the sucker 1, and the other end of the first locking member 4 abuts the lower rotating member 21 to lock and secure the lower rotating member 21 on the sucker 1.

In some aspects, a second locking member 5 (shown in FIGS. 2 and 4) for controlling the moving or locking of the rotating member 2 and the connecting member 3, is movably provided at a joint between the rotating member 2 and the connecting member 3. The upper end (an upper end in FIG. 1) of the rotating member 2 bends and extends to the side to form an upper rotating member 22. In some examples, the second locking member 5 may be implemented as a screw and a nut, which can serve as a hinge shaft and a locking member at the same time. The nut is provided at the lower side of the upper rotate part 22, and one end of the screw movably passes through the connecting member 3 (see FIG. 2) and the upper rotating member 22 in turn to be movably connected to the nut. By rotating the screw 5, the connecting member 3 and the upper rotating member 22 can be locked by the fit (tightening) of the screw and the nut.

In some aspects, the suction-operated device further includes a connecting pipe 6, and the connecting member 3 can be a pipe clamp. In this example, the connecting pipe 6 is the above-mentioned structure to be carried and mounted at the connecting position 31. That is, the connecting pipe 6 can be mounted at the connecting position 31.

In some aspects, the sucker 1 can be an electric sucker or electric suction cup. In some aspects, a mounting cavity 61 (FIG. 2) is provided in the connecting pipe 6, and a controller 7 (FIG. 3) for controlling the operation of the electric sucker 1 is built in the connecting pipe 6. Some examples of the controller 7 are a microcontroller, a microprocessor, a programmable logic device, etc. The device further includes an air pipe 8 (FIGS. 2 and 3). One end of the air pipe 8 is connected to the sucker 1, and the other end of the air pipe 8 is connected to controller 7 (insider the connection pipe 6) through one end of the connecting pipe 6.

In some aspects, a protective bracket 62 (FIG. 3) for protecting the controller 7 is provided in the mounting cavity 61, and the controller 7 is located in the protective bracket 62.

In some aspects, the other end (upper end in FIG. 2) of the connecting pipe 6 is provided with a mounting and dismounting head 63 (FIG. 2) for mounting and dismounting the connecting pipe 6 from an external structure.

In some aspects, the pipe clamp (connecting member 3) includes an upper pipe clamp 32 and a lower pipe clamp 33 (FIG. 1), and the connecting position 31 is formed between the upper pipe clamp 32 and the lower pipe clamp 33. One end of the upper pipe clamp 32 is hinged with one end of the lower pipe clamp 33, the other end of the lower pipe clamp 33 is hinged with a clamping member 34 for locking the connecting pipe 6 in the connecting position 31. The other end of the upper pipe clamp 32 is provided with a clamping groove 35 corresponding to the clamping member 34.

In some aspects, the controller 7 includes an air pressure sensor 71, a vacuum pump 72, a circuit board (not shown), and a battery 73. The battery 73, the air pressure sensor 71, and the vacuum pump 72 are all electrically connected to the circuit board. The air pressure sensor 71, the vacuum pump 72, the circuit board, and the battery 73 are all provided in the mounting cavity 61. One end of the connecting pipe 6 is provided with an air passage quick-release connector 64. The air pressure sensor 71 and the vacuum pump 72 are connected to one end of the air passage quick-release connector 64, and the other end of the air passage quick-release connector 64 is connected to the other end of the air pipe 8. The controller 7 can be operated to control (e.g., increase, decrease, and maintain) the suction, vacuum, or negative pressure generated by the sucker 1 (electric sucker) to fix the sucker on a surface.

A suction pipe 11 (FIG. 3) and a one-way valve 12 are provided on the sucker 1. One end of the air suction pipe 11 connects (pneumatically connected) to the sucker 1, the other end of the air suction pipe 11 is connected (pneumatically connected) to one end of the one-way valve 12, and the other end of the one-way valve 12 is connected (pneumatically connected) to one end of the air pipe 8.

Figure 4:
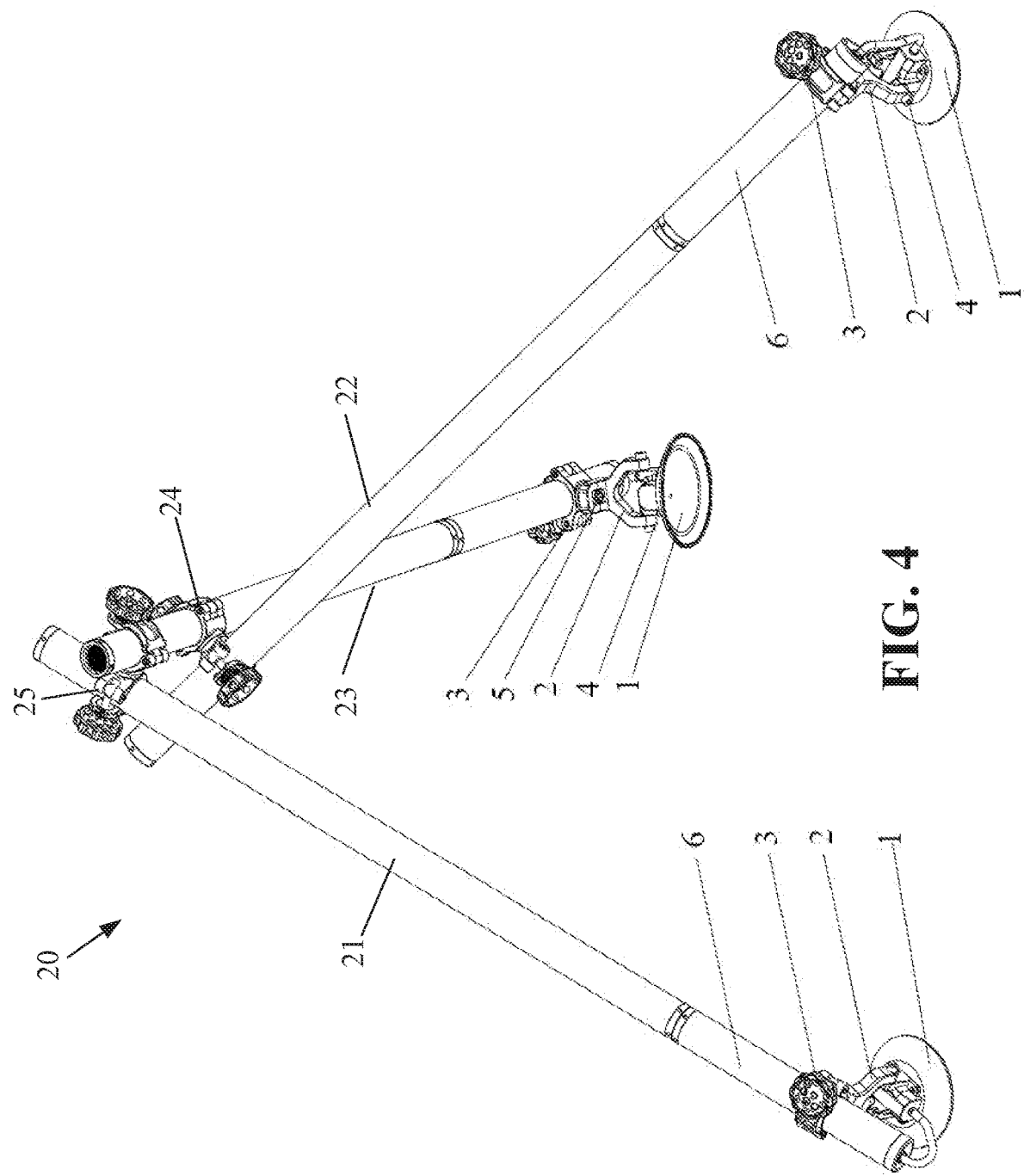
FIG. 4 is a schematic diagram illustrating a vehicle-mounted support system including three suction-operated devices of FIG. 1 according to some aspects of disclosure.
Figure 5:
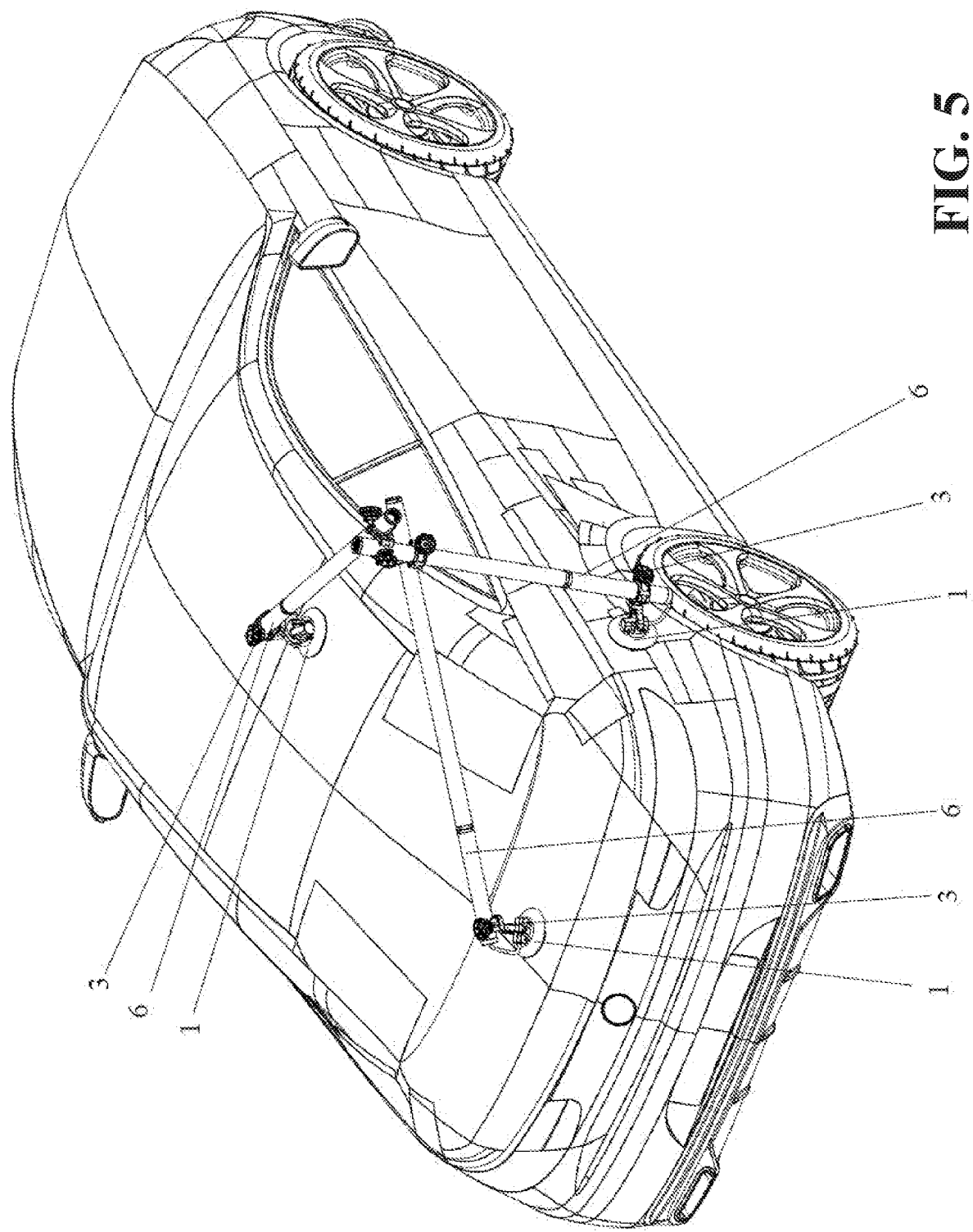
FIG. 5 is a schematic diagram of the vehicle-mounted support system of FIG. 4 mounted on a vehicle according to some aspects of the disclosure.

Referring to FIGS. 4-5, in this example, the suction-operated device described above in relation to FIGS. 1-3 may be used in a vehicle-mounted support system 20. An exemplary vehicle-mounted support system may include three suction-operated devices. The connecting pipes 6 of the suction-operated devices are respectively connected to corresponding legs 21, 23, and 23 of the vehicle-mounted support system 20. The legs 21, 23, and 23 are connected together through a pipe clamp assembly. The pipe clamp assembly has a structure including two pipe clamps 24 and 25, and the two pipe clamps are rotatably connected. The three suction-operated devices are combined to form a three-legged structure (e.g. triangular pyramid cone structure, tripod, stand, mounting frame, etc.).

The above are only exemplary embodiments of the present disclosure, and are not intended to limit the present disclosure. Any modifications, equivalent replacements and improvements made within the spirit and principle of the present disclosure shall fall within the scope of protection of the present disclosure.

The invention claimed is:

1. A suction-operated device, comprising:
   a sucker;
   a rotating member comprising a first end and a second end;
   a connecting member, wherein the first end and the second end of the rotating member are rotatably and movably connected to the connecting member and the sucker respectively, the sucker is configured to fix the suction-operated device on an external structure by controlling a suction, and the connecting member is provided with a connecting position for mounting a structure in the connecting position; and
   a connecting pipe, wherein the connecting member comprises a pipe clamp to provide the connection position, and the connecting pipe is provided at the connecting position,
   wherein the sucker comprises an electric sucker configured to control a suction used to fix the suction-operated device on the external structure,
   wherein a mounting cavity is provided in the connecting pipe, and the suction-operated device further comprises:
      a controller in the mounting cavity of the connecting pipe, the controller configured to control an operation of the sucker; and
      an air pipe, a first end of the air pipe being connected to the sucker, and a second end of the air pipe being connected to the controller through a first end of the connecting pipe.

2. The suction-operated device according to claim 1, further comprising:
   a first locking member configured to control a motion or a locking position of the sucker relative to the rotating member, wherein the rotating member is movably connected with the sucker at a joint between the sucker and the rotating member.

3. The suction-operated device according to claim 2, further comprising:
   a second locking member configured to control a motion or a locking position of the rotating member relative to the connecting member, wherein the connecting member is movably connected with the rotating member at a joint between the rotating member and the connecting member.

4. The suction-operated device according to claim 1, further comprising:
   a protective bracket in the mounting cavity, the protective bracket configured to protect the controller located in the protective bracket.

5. The suction-operated device according to claim 1, wherein the controller comprises:
   an air pressure sensor;
   a vacuum pump;
   a circuit board; and
   a battery,
   wherein the battery, the air pressure sensor, and the vacuum pump are electrically connected to the circuit board, and the air pressure sensor, the vacuum pump, the circuit board, and the battery are provided in the mounting cavity,
   wherein the first end of the connecting pipe is provided with an air passage quick-release connector, the air pressure sensor and the vacuum pump are connected to a first end of the air passage quick-release connector, and a second end of the air passage quick-release connector is connected to the second end of the air pipe.

6. The suction-operated device according to claim 5, further comprising:
   an air suction pipe on the sucker; and
   a one-way valve on the sucker,
   wherein a first end of the air suction pipe connects to the sucker, a second end of the air suction pipe connects to a first end of the one-way valve, and a second end of the one-way valve connects to a first end of the air pipe.

7. The suction-operated device according to claim 1, wherein a second end of the connecting pipe is provided with a mounting and dismounting head for mounting and dismounting the connecting pipe from the external structure.

8. The suction-operated device according to claim 1, wherein the pipe clamp comprises an upper pipe clamp and a lower pipe clamp, the connecting position is formed between the upper pipe clamp and the lower pipe clamp, a first end of the upper pipe clamp is hinged with a first end of the lower pipe clamp, a second end of the lower pipe clamp is hinged with a clamping member for locking the connecting pipe in the connecting position, and a second end of the upper pipe clamp is provided with a clamping groove corresponding to the clamping member.

* * * * *